(12) United States Patent
Etheridge (10) Patent No.: US 10,874,258 B2
(45) Date of Patent: Dec. 29, 2020

(54) CAKE PAN INVERSION TOOL AND STAND

(71) Applicant: Anita Etheridge, Goreville, IL (US)

(72) Inventor: Anita Etheridge, Goreville, IL (US)

(*) Notice: Subject to any disclaimer, the term of this patent is extended or adjusted under 35 U.S.C. 154(b) by 0 days.

(21) Appl. No.: 16/773,442

(22) Filed: Jan. 27, 2020

(65) Prior Publication Data

US 2020/0329917 A1 Oct. 22, 2020

Related U.S. Application Data

(60) Provisional application No. 62/836,794, filed on Apr. 22, 2019.

(51) Int. Cl.
*F16M 11/00* (2006.01)
*A47J 43/28* (2006.01)

(52) U.S. Cl.
CPC ..................... *A47J 43/28* (2013.01)

(58) Field of Classification Search
CPC ......... F16M 11/00; F16M 11/06; F16M 11/02
USPC ...... 248/158, 167, 176.2; 211/196, 197, 205
See application file for complete search history.

(56) References Cited

U.S. PATENT DOCUMENTS

| 2,188,955 | A | | 2/1940 | Nattson | |
|---|---|---|---|---|---|
| 2,922,608 | A | * | 1/1960 | Heuer | A47J 43/28 248/167 |
| 3,066,918 | A | * | 12/1962 | Springer | A21B 3/00 165/67 |
| 3,126,948 | A | * | 3/1964 | Springer et al. | A21B 3/135 165/67 |
| 5,894,944 | A | * | 4/1999 | Swift | A47G 23/08 211/128.1 |
| 6,971,613 | B2 | * | 12/2005 | Shendelman | A47F 5/04 211/196 |
| D636,637 | S | * | 4/2011 | Lupkes | D7/501 |
| 2005/0092189 | A1 | | 5/2005 | Hall | |

* cited by examiner

*Primary Examiner* — Steven M Marsh
(74) *Attorney, Agent, or Firm* — Dale J. Ream

(57) ABSTRACT

A cake pan inversion tool includes first and second leg members having first and second head portions and first and second body portions extending away from the first and second head portions, respectively. The second leg member is pivotally coupled to the first leg member at a pivot point displaced from terminal edges of the first and second head portions, respectively. A compression spring extends between inner surfaces of the first and second body portions that biases the first and second body portions away from one another. The first and second head portions, together, form a head section that is pivotally movable between an insert configuration at which the head portions bear against one another in preparation for insertion into a center void of the cake pan and a deployed configuration at which the head portions are displaced outwardly capturing the cake pan.

19 Claims, 9 Drawing Sheets

CAKE PAN INVERSION TOOL AND STAND

REFERENCE TO RELATED APPLICATIONS

This application claims the priority of provisional patent application U.S. Ser. No. 62/836,794 filed Apr. 22, 2019 titled RIDDI BOTTLE and which is incorporated herein by reference in its entirety.

BACKGROUND OF THE INVENTION

This invention relates generally to support and cooling devices and, more particularly, to a tool for single handed inversion of an angel food cake pan and stand for supporting the inverted pan.

There are types of cake which must be suspended in an inverted position before they are suitable for eating. For example, an angel food cake or bunt cake is typically baked in an oven in a cake pan that must be flipped over, suspended, and then, when cool, cut and prepared to serve. When removed from the oven, the cake is not totally set up and will collapse if not cooled entirely. In the past, the pan may be removed from the oven with oven mitts and, with great care, flipped over and suspended atop a glass bottle— typically a two-handed activity. In fact, flipping an angel food cake pan requires two steady and well coordinated hands.

Unfortunately, some individuals do not have two steady hands with which to flip an angel food cake pan—whether due to disability, injury, age, or the like. Therefore, it would be desirable to have a kitchen utensil in the form of a cake pan inversion tool and support stand for lifting up an angel food cake pan from the oven, flipping it over, and then standing it on the counter for cooling. Further, it would be desirable to have a cake pan inversion tool and support stand that can be used with a single hand. In addition, it would be desirable to have a cake pan inversion tool and support stand in which the tool is inserted into the center void of a cake pan and then leg members are squeezed so as to capture the pan that it may be lifted, flipped, and positioned for cooling.

SUMMARY OF THE INVENTION

A cake pan inversion tool and support stand according to the present invention includes a first leg member having a first head portion and a first body portion coupled to and extending away from the first head portion along a first linear axis and a second leg member having a second head portion and a second body portion coupled to and extending away from the second head portion along a second linear axis. The second leg member is pivotally coupled to the first leg member at a pivot juncture displaced from terminal edges of the first and second head portions, respectively. Further, a compression spring extends between inner surfaces of the first and second body portions, respectively, that normally biases the first and second body portions away from one another. The first and second head portions, together, form a head section that is pivotally movable between a normal insert configuration at which the first and second head portions bear against one another in preparation for insertion into the middle portion of the cake pan and a deployed configuration at which the terminal ends of the first and second head portions, respectively, are displaced outwardly from one another, whereby to capture the cake pan.

Therefore, a general object of this invention is to provide a cake pan inversion tool and support stand for lifting up an angel food cake pan from the oven, flipping it over, and then standing it on the counter for cooling.

Another object of this invention is to provide a cake pan inversion tool and support stand, as aforesaid, for single handed use.

Still another object of this invention is to provide a cake pan inversion tool and support stand, as aforesaid, in which the tool is inserted into the center void of a cake pan and then leg members are compressed so as to capture the pan so that it may be lifted, flipped, and positioned for cooling.

Yet another object of this invention is to provide a cake pan inversion tool and support stand, as aforesaid, that is economical to manufacture and is easy to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an exploded view of the cake pan inversion tool and support stand as in FIG. 1a;

FIG. 2a is a top view of the cake pan inversion tool and support stand as in FIG. 1a;

FIG. 2b is a sectional view taken along line 2b-2b of FIG. 2a;

FIG. 5a is a top view of the cake pan inversion tool and support stand as in FIG. 3a;

FIG. 5b is a sectional view taken along line 4b-4b of FIG. 3a;

FIG. 6b is a sectional view taken along line 6b-6b of FIG. 6a;

FIG. 7b is an exploded view of the cake pan inversion tool and support stand as in FIG. 7a;

FIG. 8a is a top view of the cake pan inversion tool and support stand as in FIG. 3a;

FIG. 8b is a sectional view taken along line 8b-8b of FIG. 8a;

FIG. 9b is a sectional view taken along line 9b-9b of FIG. 9a; and

DESCRIPTION OF THE PREFERRED EMBODIMENT

A cake pan inversion tool and support stand according to a preferred embodiment of the present invention will now be described with reference to FIG. 1a to 9c of the accompanying drawings. The cake pan inversion tool and support stand 10 includes a first leg member 20 having a first head portion 21 and a first body portion 24, a second leg member 30 having a second head portion 31 and a second body portion 34, and a compression spring 40 normally biasing the body portions open in a manner that enables a user to secure an angel food cake pan 12, invert the pan, and support the pan for cooling—all with a single-handed use of the present invention.

The cake pan inversion tool and support stand 10 includes a first leg member 20 pivotally coupled to a second leg member 30. Together, the first and second leg members have a generally bottle-shaped configuration—meaning that a head section 16 has a smaller diameter and circumference than a body section 18 that depends from the head section 16. More particularly, the first leg member 20 includes a first head portion 21 and a first body portion 24 extending from the first head portion 21. The first head portion 21 has a generally hemispherical (i.e. half of a cylinder) configuration and includes a first terminal edge 22 and a first inner edge 23 opposite said first terminal edge 22. Further, the first body portion 24 also defines a generally hemispherical or half cylinder configuration and includes a first body inner edge 25 coupled to the first inner edge 23 of the first head portion 21 and a first body terminal edge 36 opposite said first body inner edge 25. It is understood that the first terminal edge 22 of the first head portion 21 will be referred to as a top end of the cake pan inversion tool 10 and the first body terminal edge 36 will be referred to as a bottom end of the cake pan inversion tool 10. Preferably, the first leg member 20 extends along and defines an imaginary first longitudinal (vertical) axis 44 that is oriented to taper outwardly between the top end and the bottom end.

Similarly, the second leg member 30 includes a second head portion 31 and a second body portion 34 extending from the second head portion 31. The second head portion 31 has a generally hemispherical (i.e. half of a cylinder) configuration and includes a second terminal edge 32 and a second inner edge 33 opposite said second terminal edge 32. Further, the second body portion 34 also defines a generally hemispherical or half cylinder configuration and includes a second body inner edge 35 coupled to the first inner edge 23 of the first head portion 21 and a second body terminal edge 36 opposite said second body inner edge 35. It is understood that the second terminal edge 32 of the second head portion 31 will be referred to as a top end of the cake pan inversion tool 10 and the second body terminal edge 36 will be referred to as defining the bottom end of the cake pan inversion tool 10. Preferably, the second leg member 30 extends along and defines an imaginary second longitudinal (vertical) axis 46 that is oriented to taper outwardly between the top end and the bottom end.

Figure 1A:
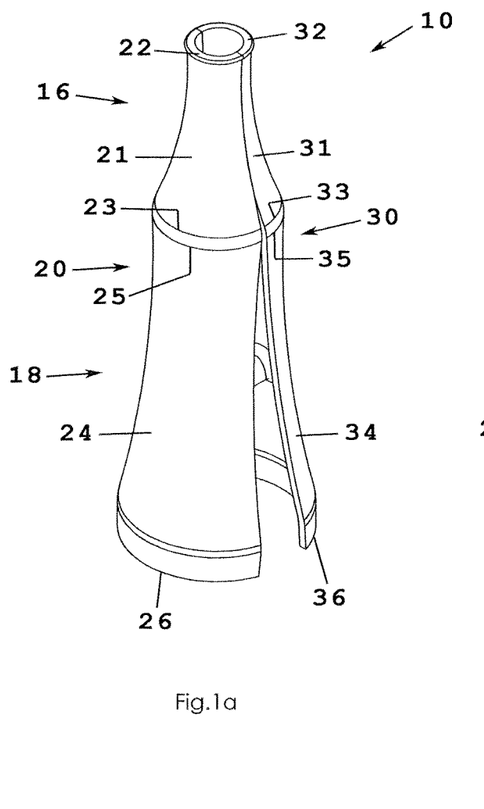
FIG. 1a is a perspective view of a cake pan inversion tool and support stand according to a preferred embodiment of the present invention.
Figure 1B:
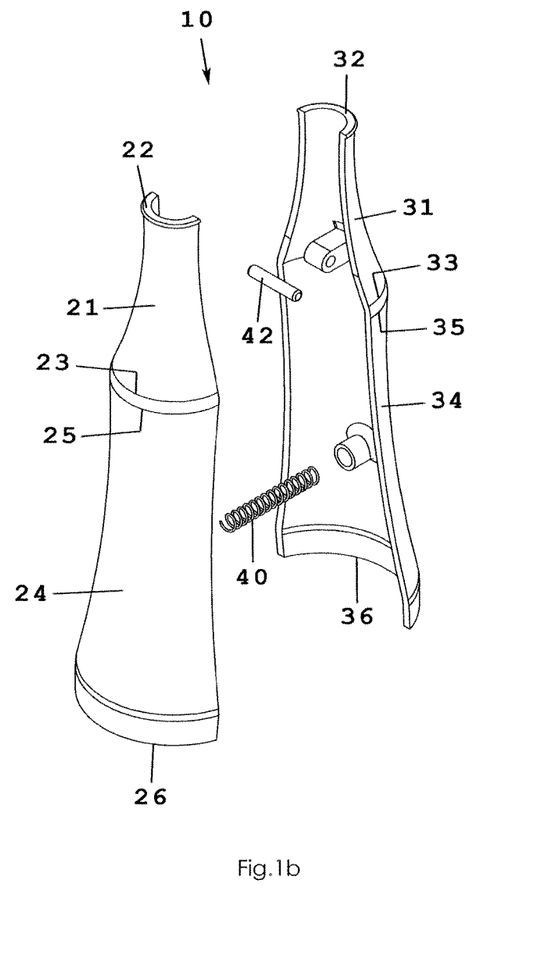

The first leg member 20 is pivotally coupled to the second leg member 30 at a pivot juncture that is vertically (i.e. downwardly) displaced from the terminal edges 22, 32 of the first and second head portions 21, 31, respectively. More particularly, first and second pivot mounting structures (un-numbered) may be positioned adjacent inner edges 23, 33 of the first and second head portions 21, 31 respectively, and pivotally coupled together using a pivot fastener, such as a pivot pin 42 (FIG. 1b).

Figure 2A:
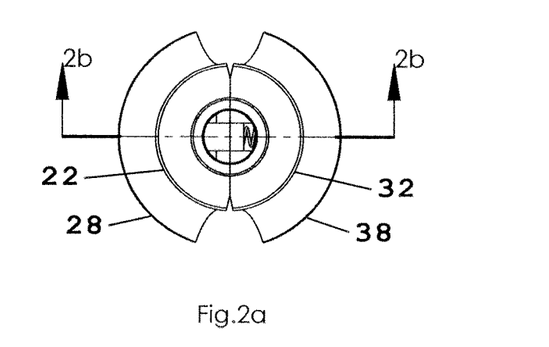
Figure 2B:
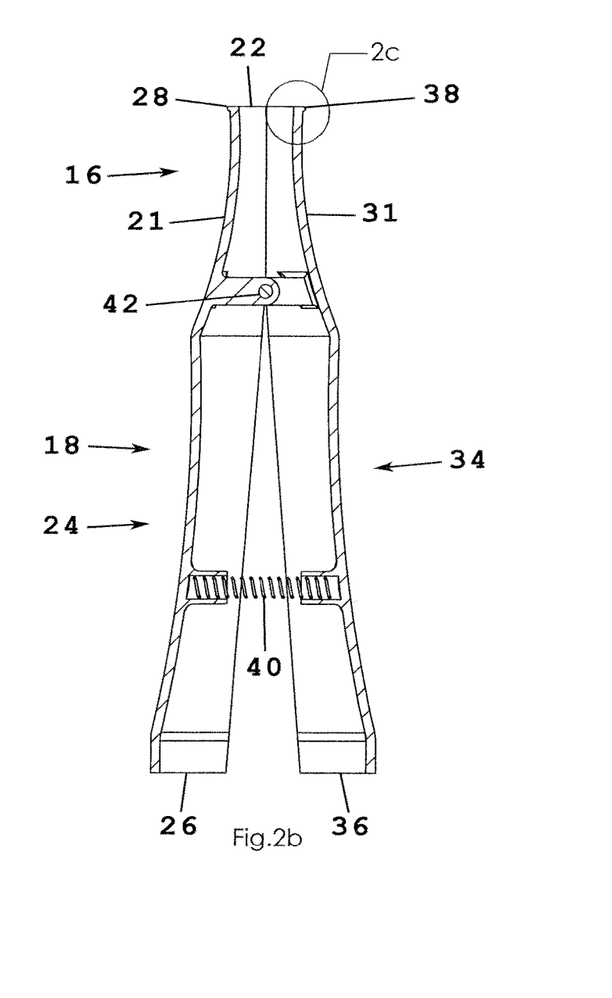

In another aspect, the cake pan inversion tool and support stand 10 includes a spring 40 that is operatively linked or coupled to opposed inner surfaces of the body portions 24, 34 of the first and second leg members 20, 30, respectively. Preferably, the spring 40 is a expansion spring 40 that is normally at an extended configuration, e.g. is normally extending toward its maximum open or uncompressed configuration so as to push the body portions 24, 34 outwardly and away from each other (FIG. 2b). The spring 40 may also be a coil spring. A coil spring may itself store energy and is configured to absorb shock or maintain a force between contacting surfaces—in this case normally pushing against inner surfaces of body portions of legs, respectively. Alternatively, the spring may be a coil spring that is wound and wound about the pivot pin 42 and having distal ends extending away from the pivot pin 42 in opposed directions so as to normally push outwardly against opposing body portions 24, 34 (FIG. 7b) as described above.

As will be described later, the normal configuration of the body portions 24, 34 extending outwardly causes the body portions 24, 34 to move toward one another as will be referred to as an insert configuration, the leg members 20, 30 being pivotally coupled to one another via the pivot pin 42 (i.e. at the pivot junction) described above. In other words, movement of the body portions 24, 34 causes inverse movement of the head portions 21, 31. The insert configuration closes the body portions 24, 34 together such that the head section 16 may be inserted into center void 14 of an angel food cake pan 12 as will be described later in more detail (FIG. 5b) before being deployed.

Figure 2C:
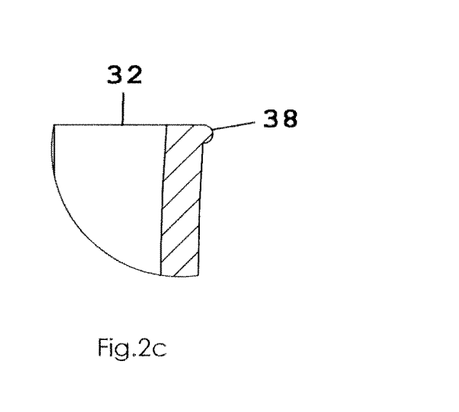
FIG. 2c is an isolated view on an enlarged scale taken from FIG. 2b.
Figure 3A:
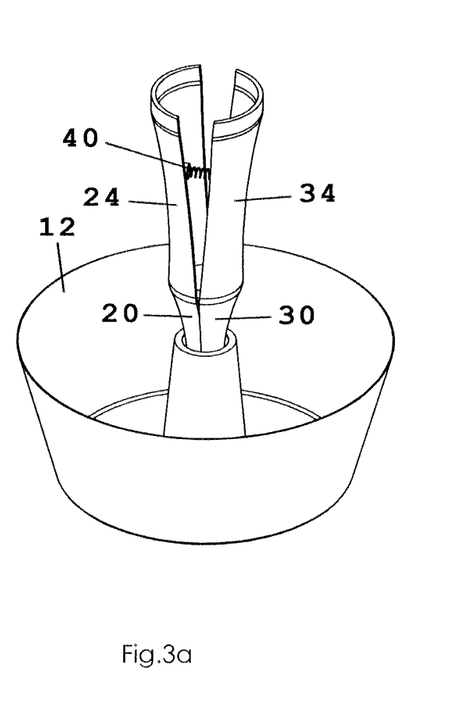
FIG. 3a is a perspective view of the cake pan inversion tool and support stand illustrated inserted into the cake pan.
Figure 3B:
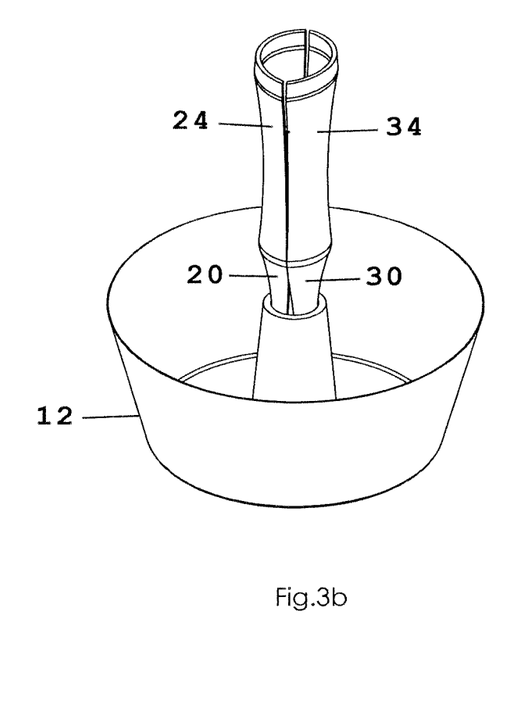
FIG. 3b is a perspective view of the cake pan inversion tool and support stand illustrated inserted into and capturing the cake pan.
Figure 5A:
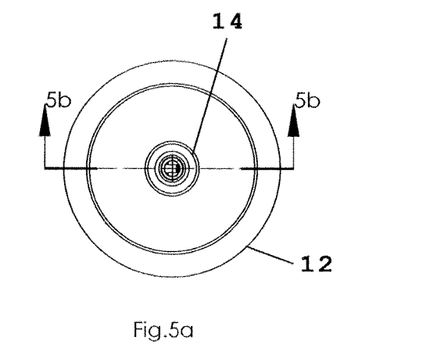
Figure 5B:
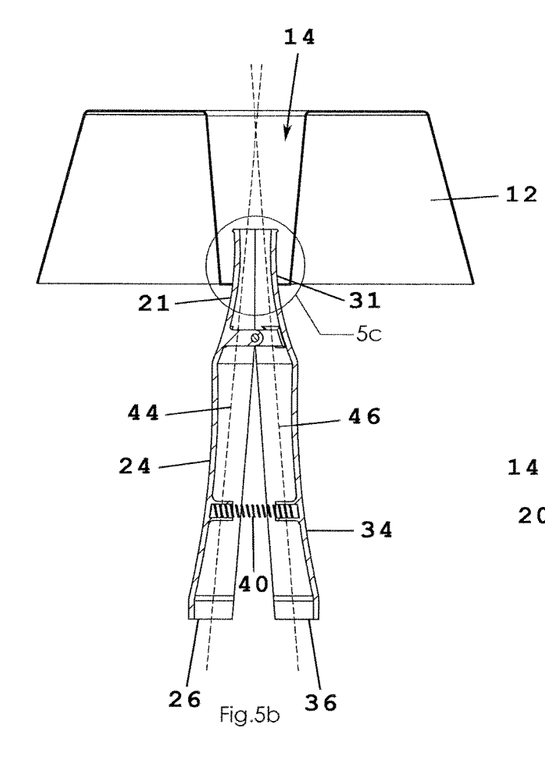
Figure 5C:
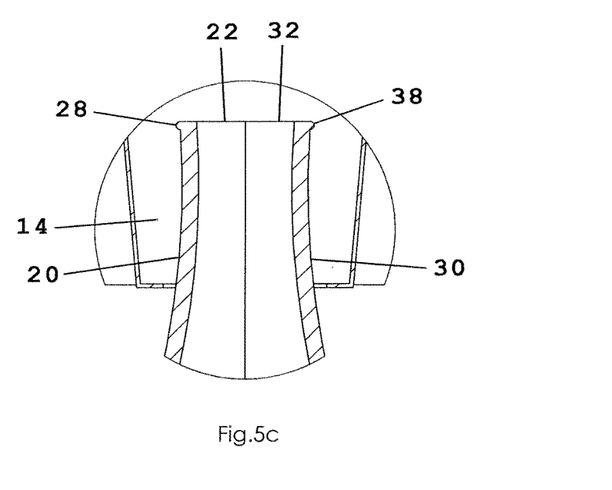
FIG. 5c is an isolated view on an enlarged scale taken from FIG. 4b.
Figure 6A:
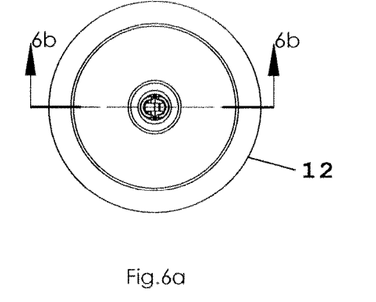
FIG. 6a is a top view of the cake pan inversion tool and support stand as in FIG. 3b.
Figure 6B:
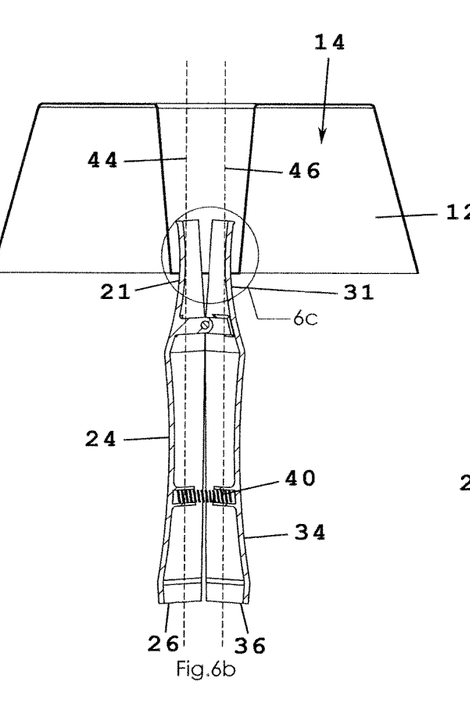
Figure 6C:
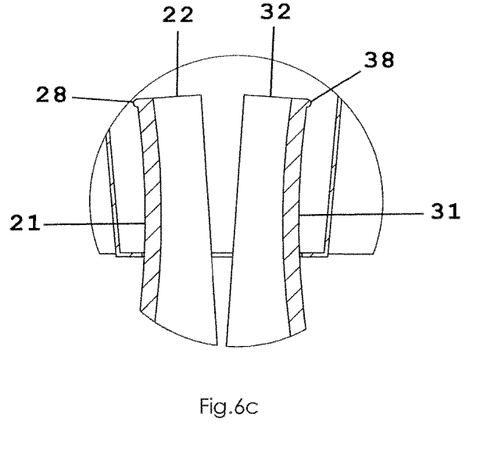
FIG. 6c is an isolated view on an enlarged scale taken from FIG. 6b.
Figure 7A:
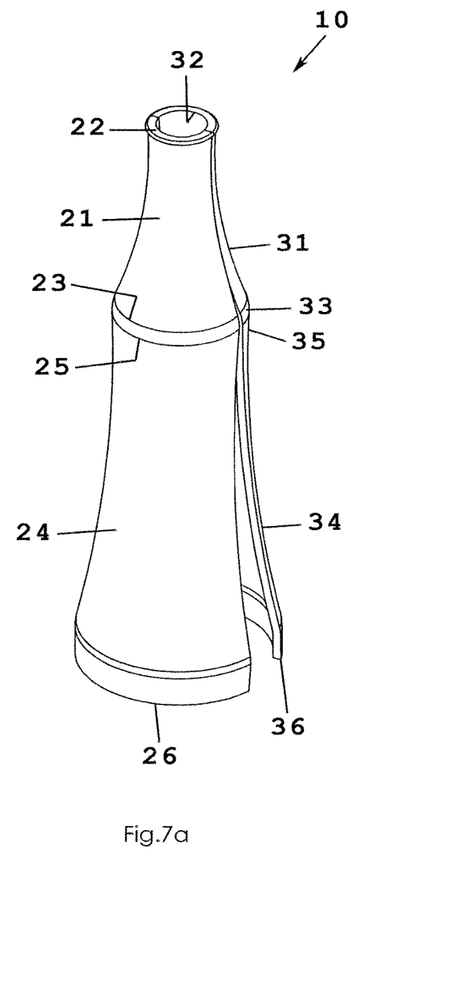
FIG. 7a is another perspective view of a cake pan inversion tool and support stand according to an alternative embodiment of the present invention.
Figure 7B:
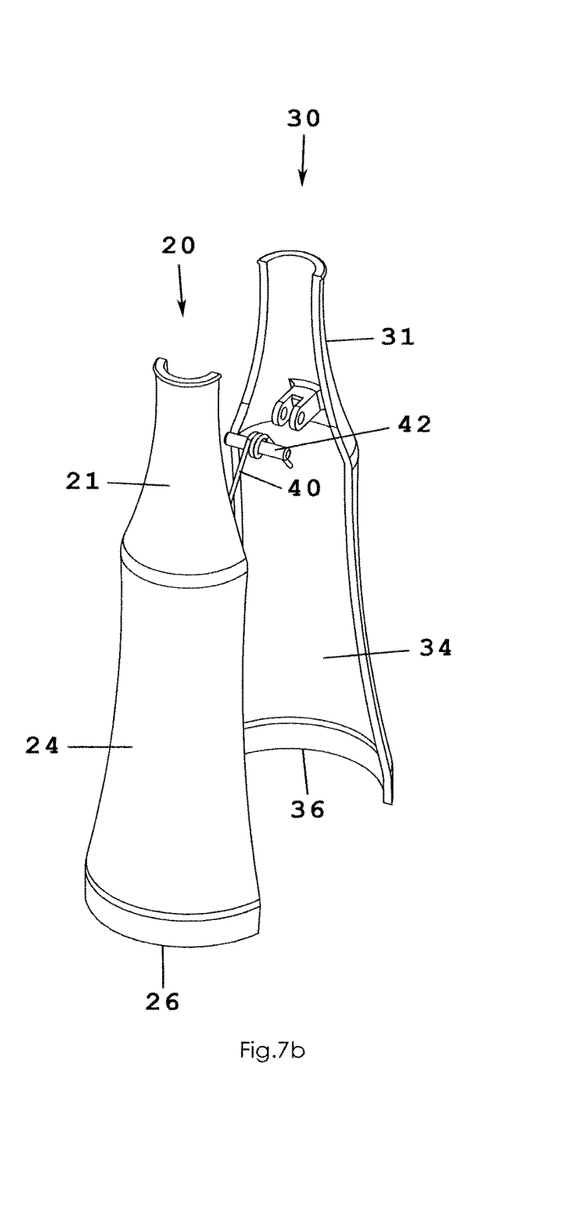
Figure 8A:
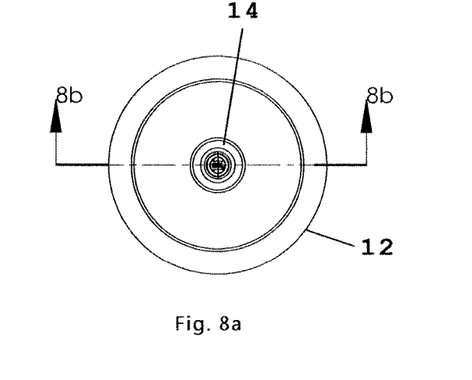
Figure 8B:
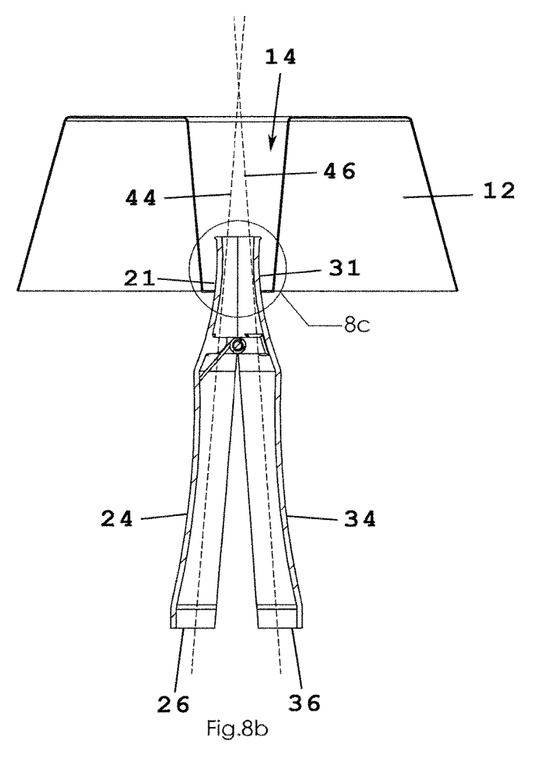
Figure 8C:
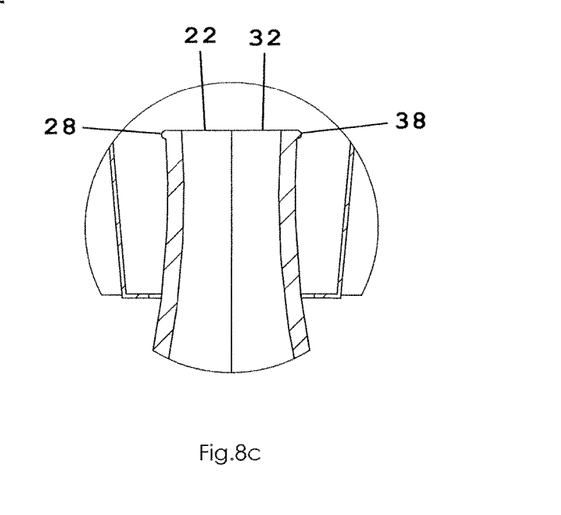
FIG. 8c is an isolated view on an enlarged scale taken from FIG. 8b.
Figure 9A:
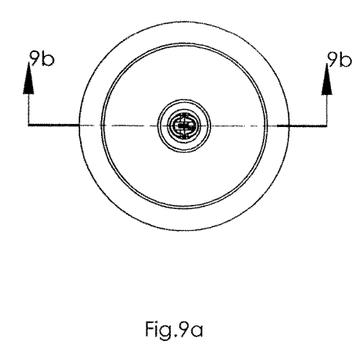
FIG. 9a is a top view of the cake pan inversion tool and support stand as in FIG. 3b.
Figure 9B:
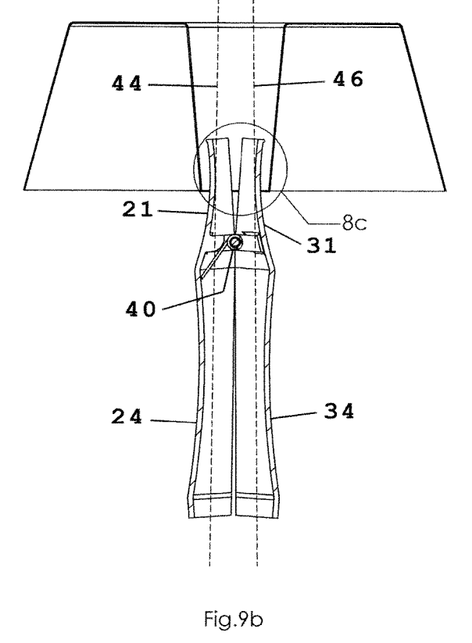
Figure 9C:
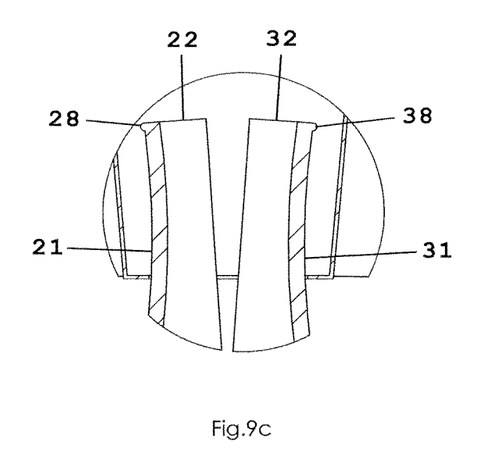
FIG. 9c is an isolated view on an enlarged scale taken from FIG. 9b.

The construction of the cake pan inversion tool and support stand 10 is clarified by a discussion of the preferred geometries, linear axes, and movement of the components. More particularly, the first head portion 21 and second head portion 31, together, form what is referred to as a head section 16 that is pivotally movable (at the pivot juncture described above) between an "insert configuration" at which the second head portion 31 bears against the first head portion 21 in preparation for insertion into the void 14 of the cake pan 12 (FIG. 5b) and a "deployed configuration" at which the second head portion 31 is spaced apart or displaced from the first head portion 21 in order to capture or bear against an inner surface of the cake pan 12 (FIG. 6b). In fact, the terminal end of each first head portion 21 and second head portion 31 includes a first ledge 28 and second ledge 38, respectively, that are configured to enhance or more securely capture the cake pan 12 (FIGS. 2c and 6c).

As discussed above, the first head portion 21 and first body portion 24 are constructed along a first imaginary longitudinal axis 44 having a linear configuration. Likewise, the second head portion 31 and second body portion 34 are constructed along a second imaginary longitudinal axis 46 having a linear configuration. With further consideration of the inverted and pivotal movement of the leg member 20, 30, the first longitudinal axis 44 may be offset at the insert configuration (i.e. non-parallel or intersecting) as shown in FIG. 5b. By contrast, the first longitudinal axis 44 is parallel to the second longitudinal axis 46 at the deployed configuration as shown in FIG. 6b. The entire first leg member 20 has a generally hemispherical configuration as does the entire second leg member 30 such that the first and second leg member 20, 30, together, have a generally bottle shaped configuration. Specifically, the first leg member 20 may taper outwardly as the first body portion 24 has a gradually diameter larger than the diameter of the first head portion 21. Likewise, the second leg member 30 may taper outwardly as the second body portion 34 has a gradually diameter larger than the diameter of the first head portion 21.

In another aspect, the first body portion 24 has an outer surface that includes a grip texture or material that enhances grip, e.g. rubber. Similarly, the second body portion 34 has an outer surface that includes a grip texture or material that enhances grip, e.g. rubber.

Figure 4:
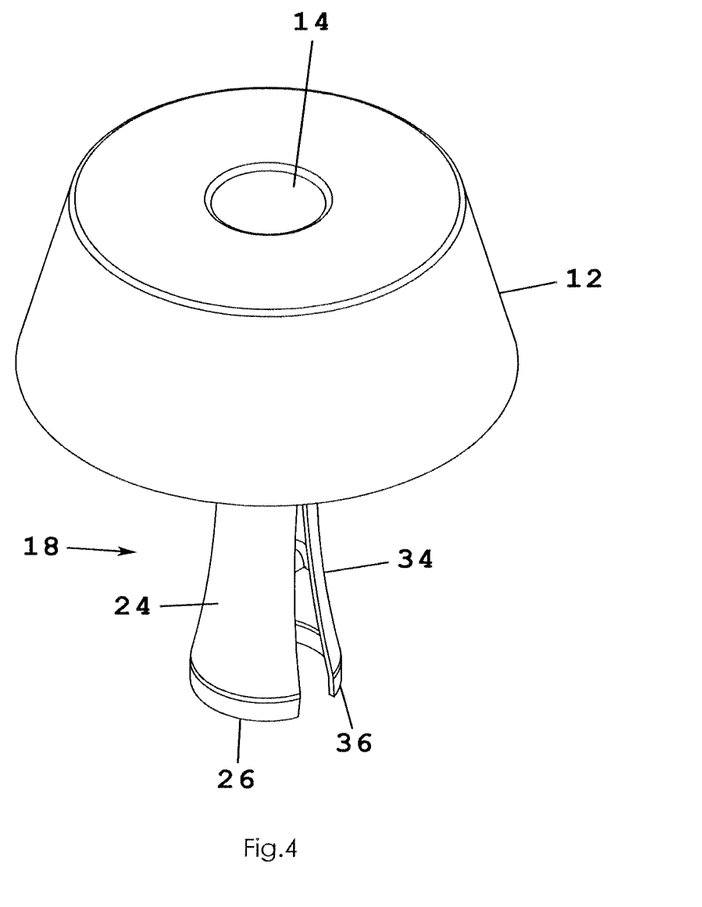
FIG. 4 is a perspective view of the cake pan inversion tool and support stand inverted and in use as a cake pan support stand.

In use, the cake pan inversion tool and support stand 10 forms a kitchen tool for removing an angel food or bunt cake type cake pan from an oven, invert the pan, and stand it up for cooling. Specifically, the oven door may be opened and the rack extended to reveal the cake pan 12. The tool may be positioned in the insert configuration and inserted into the center void 14 of the cake pan 12. Then, a user merely grips or compresses the body portions 24, 34 together which causes the head portions 21, 31 to open or expand—thus capturing the cake pan 12. The cake pan 12 may be flipped over (i.e. inverted) and the tool may stand on the counter on its body portions 24, 34 and the cake pan 12 is supported thereon for cooling (FIG. 4).

It is understood that while certain forms of this invention have been illustrated and described, it is not limited thereto except insofar as such limitations are included in the following claims and allowable functional equivalents thereof.

The invention claimed is:

1. A cake pan inversion tool and support stand for insertion into a cake pan having an empty middle portion, said cake pan inversion tool and support stand comprising:
    a first leg member having a first head portion and a first body portion coupled to and extending away from said first head portion along a first linear axis;
    a second leg member having a second head portion and a second body portion coupled to and extending away from said second head portion along a second linear axis;
    wherein said second leg member is coupled to said first leg member at a pivot juncture displaced from terminal edges of said first and second head portions, respectively; and
    a spring extending between inner surfaces of said first and second body portions, respectively, that normally biases said first and second body portions away from one another;
    wherein:
        said first leg member tapers outwardly along a first linear axis between said terminal edge of said first leg portion and said terminal edge of said first body portion; and
        said second leg member tapers outwardly along a second linear axis between said terminal edge of said second leg portion and said terminal edge of said second body portion.

2. The cake pan inversion tool and support stand as in claim 1, wherein:
    said first head portion of said first leg member includes a first terminal edge and a first inner edge opposite said first terminal edge;
    said second head portion of said second leg member includes a second terminal edge and a second inner edge opposite said second terminal edge;
    wherein said pivot juncture includes a pivot fastener positioned adjacent said first and second inner edges, respectively.

3. The cake pan inversion tool and support stand as in claim 1, wherein:
    said first body portion includes a first body inner edge coupled to said first inner edge of said first head portion and a first body terminal edge opposite said first body inner edge; and
    said second body portion includes a second body inner edge coupled to said second inner edge of said second head portion and a second body terminal edge opposite said second body inner edge.

4. The cake pan inversion tool and support stand as in claim 3, wherein:
    said second head portion is pivotally coupled to said first head portion at said pivot juncture with a pivot coupling fastener that is displaced from said terminal ends of said first and second head portions;
    said first and second head portions, together, form a head section that is pivotally movable between a normally insert configuration at which said first and second head portions bear against one another in preparation for insertion into the middle portion of the cake pan and a deployed configuration at which said terminal ends of said first and second head portions, respectively, are displaced outwardly from one another, whereby to capture the cake pan.

5. A cake pan inversion tool and support stand for insertion into a cake pan having an empty middle portion, said cake pan inversion tool and support stand comprising:
    a first leg member having a first head portion and a first body portion coupled to and extending away from said first head portion along a first linear axis;
    a second leg member having a second head portion and a second body portion coupled to and extending away from said second head portion along a second linear axis;
    wherein said second leg member is coupled to said first leg member at a pivot juncture displaced from terminal edges of said first and second head portions, respectively; and
    a spring extending between inner surfaces of said first and second body portions, respectively, that normally biases said first and second body portions away from one another;
    wherein said spring is an extension spring normally biased to push outwardly in opposite directions.

6. The cake pan inversion tool and support stand as in claim 1, wherein:
    said first body portion includes a first outer surface that has a grip texture; and
    said second body portion includes a second outer surface that has a grip texture.

7. The cake pan inversion tool and support stand as in claim 4, wherein:
    said first terminal edge of said first head portion includes a first ledge extending outwardly so as to capture the cake pan at said deployed configuration; and
    said second terminal edge of said second head portion includes a second ledge extending outwardly so as to capture the cake pan at said deployed configuration.

8. A cake pan inversion tool and support stand for insertion into a cake pan having an empty middle portion, said cake pan inversion tool and support stand comprising:
    a first leg member that includes a first head portion having a hemispherical configuration, said first head portion having a first terminal edge and a first inner edge opposite said first terminal edge;
    wherein said first leg member includes a first body portion having a hemispherical configuration, said first body portion having a first body inner edge coupled to said first inner edge and a first body terminal edge opposite said first body inner edge;

a second leg member that includes a second head portion having a hemispherical configuration, said second head portion having a second terminal edge and a second inner edge opposite said second terminal edge;

wherein said second leg member includes a second body portion having a hemispherical configuration, said second body portion having a second body inner edge coupled to said second inner edge and a second body terminal edge opposite said second body inner edge;

wherein said first leg member is pivotally coupled to said second leg member at a pivot point adjacent said inner edges of first and second leg members, respectively; and a compression spring extending between inner surfaces of said first and second body portions, respectively, that normally biases said first and second body portions away from one another.

9. The cake pan inversion tool and support stand as in claim 8, wherein said first and second head portions, together, form a head section that is pivotally movable between an insert configuration at which said first and second head portions bear against one another in preparation for insertion into the middle portion of the cake pan and a deployed configuration at which said terminal ends of said first and second head portions, respectively, are displaced outwardly from one another, whereby to capture the cake pan.

10. The cake pan inversion tool and support stand as in claim 9, wherein compression of said first and second body portions towards one another compresses said compression spring and move said head section toward said deployed configuration.

11. The cake pan inversion tool and support stand as in claim 9, wherein:
said first head portion and said first body portion are coupled together along a first linear axis;
said second head portion and said second body portion are coupled together along a second linear axis;
wherein said first linear axis is parallel to said second linear axis at said deployed configuration; and
wherein said first linear axis is offset from said second linear axis at said insert configuration.

12. The cake pan inversion tool and support stand as in claim 9, wherein:
said first terminal edge of said first head portion includes a first ledge extending outwardly so as to capture the cake pan at said deployed configuration; and
said second terminal edge of said second head portion includes a second ledge extending outwardly so as to capture the cake pan at said deployed configuration.

13. The cake pan inversion tool and support stand as in claim 8, wherein said compression spring is normally biased to push outwardly in opposite directions.

14. The cake pan inversion tool and support stand as in claim 8, wherein:
said first body portion includes a first outer surface that has a grip texture; and
said second body portion includes a second outer surface that has a grip texture.

15. A cake pan inversion tool and support stand for insertion into a cake pan having an empty middle portion, said cake pan inversion tool and support stand comprising:

a first head portion that includes a first head portion having a hemispherical configuration, said first head portion having a first terminal edge and a first inner edge opposite said first terminal edge;

a second head portion pivotally coupled to the first head portion with a pivot coupling fastener displaced from terminal ends of said first and second head portion, said second head portion including a hemispherical configuration and having a second terminal edge and a second inner edge opposite said second terminal edge;

wherein said first and second head portions, together, form a head section that is pivotally movable between an insert configuration at which said first and second head portions bear against one another in preparation for insertion into the middle portion of the cake pan and a deployed configuration at which said terminal ends of said first and second head portions, respectively, are displaced outwardly from one another, whereby to capture the cake pan;

a first body portion coupled to said first head portion and extending along an outwardly tapered first linear axis that includes said first head portion and said first body portion;

a second body portion coupled to said second head portion and extending along an outwardly tapered second linear axis that includes said second head portion and said second body portion; and a compression spring extending between inner surfaces of said first and second body portions, respectively, that normally biases said first and second body portions away from one another;

wherein compression of said compression spring by compression of said first and second body members toward one another moves said first and second head portions to said deployed configuration.

16. The cake pan inversion tool and support stand as in claim 15, wherein:
said first terminal edge of said first head portion includes a first ledge extending outwardly so as to capture the cake pan at said deployed configuration; and
said second terminal edge of said second head portion includes a second ledge extending outwardly so as to capture the cake pan at said deployed configuration.

17. The cake pan inversion tool and support stand as in claim 15, wherein:
said first head portion and said first body portion are coupled together along a first linear axis;
said second head portion and said second body portion are coupled together along a second linear axis;
wherein said first linear axis is parallel to said second linear axis at said deployed configuration; and
wherein said first linear axis is offset from said second linear axis at said insert configuration.

18. The cake pan inversion tool and support stand as in claim 15, wherein said compression spring is normally biased to push outwardly in opposite directions.

19. The cake pan inversion tool and support stand as in claim 15, wherein:
said first body portion includes a first outer surface that has a grip texture; and
said second body portion includes a second outer surface that has a grip texture.

* * * * *